United States Patent
Moos et al.

(10) Patent No.: US 10,953,821 B2
(45) Date of Patent: Mar. 23, 2021

(54) PLANAR MOTOR VEHICLE LINING COMPONENT HAVING AN INTEGRATED DOUBLING REINFORCING PORTION

(71) Applicant: Röchling Automotive SE & Co. KG, Mannheim (DE)

(72) Inventors: Egon Moos, Neustadt (DE); Liubov Sorochynska, Enkenbach-Alsenborn (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 121 days.

(21) Appl. No.: 16/510,199

(22) Filed: Jul. 12, 2019

(65) Prior Publication Data
US 2020/0055465 A1  Feb. 20, 2020

(30) Foreign Application Priority Data
Aug. 17, 2018  (DE) .................. 10 2018 213 938.5

(51) Int. Cl.
*B62D 25/20* (2006.01)
*B60R 13/08* (2006.01)

(52) U.S. Cl.
CPC ...... *B60R 13/0861* (2013.01); *B62D 25/2072* (2013.01)

(58) Field of Classification Search
CPC ........... B60R 13/0861; B60R 13/0838; B62D 25/2072; B60N 3/046; B60N 3/048
USPC .............................. 296/97.23, 39.1
See application file for complete search history.

(56) References Cited

U.S. PATENT DOCUMENTS

| 4,804,570 A | * | 2/1989 | Bedics .................... A47L 23/24 |
| | | | 15/217 |
| 8,746,782 B2 | * | 6/2014 | Naoi ...................... B62D 35/02 |
| | | | 296/193.07 |
| 9,126,631 B2 | * | 9/2015 | Lungershausen ....... F16B 43/02 |
| 9,333,890 B2 | * | 5/2016 | Garbarino .............. B60N 3/046 |
| 10,246,135 B2 | * | 4/2019 | Kayadere ............... B62D 25/20 |
| 10,759,480 B2 | * | 9/2020 | Moos ................... B62D 27/023 |

(Continued)

FOREIGN PATENT DOCUMENTS

| CH | 692780 A5 | 10/2002 |
| EP | 0316529 A2 | 5/1989 |
| WO | 2015159003 A1 | 10/2015 |

OTHER PUBLICATIONS

German Search Report for corresponding DE 10 2018 213 938.5 dated Jul. 1, 2019, 9 pgs.

(Continued)

*Primary Examiner* — Pinel E Romain
(74) *Attorney, Agent, or Firm* — Rankin Hill & Clark LLP; Gregory S. Vickers

(57) ABSTRACT

A planar motor vehicle lining component made of a plastic-containing material, having a liner portion of predetermined shape which is embodied to cover, in the completely installed state, a predetermined area on a motor vehicle, the lining component includes at least one reinforcing portion that is connected to the lining portion and is connected by means of a hinge portion to the lining portion foldably in such a way that a supporting surface region of the reinforcing portion is conveyable, by folding over the reinforcing portion, into abutting engagement with an abutting surface region of the lining portion.

20 Claims, 3 Drawing Sheets

(56) References Cited

U.S. PATENT DOCUMENTS

2005/0236860 A1* 10/2005 Nagamoto ................ B60R 7/04
                                                    296/37.14
2010/0075093 A1*  3/2010 Gifford .................. B60N 3/044
                                                       428/43
2016/0229323 A1*  8/2016 Veik ....................... B60N 3/044
2018/0229637 A1*  8/2018 Parra Becerra ........ B60N 3/044

OTHER PUBLICATIONS

Espacenet Bibliographic data:WO 2015159003(A1), Published Oct. 22, 2015, 1 pg.
Espacenet Bibliographic data:EP 0316529 (A2), Published May 24, 1989, 1 pg.
Espacenet Bibliographic data:CH 692780 (A5), Published Oct. 31, 2002, 1 pg.

* cited by examiner

PLANAR MOTOR VEHICLE LINING COMPONENT HAVING AN INTEGRATED DOUBLING REINFORCING PORTION

The present invention relates to a planar motor vehicle lining component made of a plastic-containing material, having a liner portion of predetermined shape which is embodied to cover, in the completely installed state, a predetermined area on a motor vehicle.

BACKGROUND OF THE INVENTION

Planar lining components on motor vehicles, for example an underbody liner or a wheel well liner or an engine compartment liner, serve to acoustically and/or thermally and/or mechanically delimit large-area regions of the motor vehicle with respect to an adjacent environment, and protect them from external influences. While thermal and acoustic insulation tends to predominate in the context of an engine compartment liner, an important mechanical protective effect from impacting objects also exists in the context of a wheel well liner or underbody liner.

The term "planar" refers here to a lining component whose thickness dimension is considerably less than its dimension in two principal directions of extent which are orthogonal both to one another and to the thickness direction. In planar lining components, the dimension in the principal directions of extent is preferably more than 10 times or even more than 20 times the dimension in a thickness direction.

For reasons relating both to their effectiveness in terms of thermal and acoustic insulation and to minimum weight per unit area, the aforesaid planar motor vehicle lining components are often embodied as porous components, for example constituting a thermoplastically bonded fiber web material.

With decreasing weight per unit area the tear-out strength of the lining components unfortunately also decreases, making them difficult to fasten onto the motor vehicle. In order to fasten lining components onto the motor vehicle, fastening openings that pass through the lining components in a thickness direction are often penetrated by fastening means such as screws, clips, rivets, and the like, and a holding configuration of the fastening means engages behind the openings. That portion of the fastening means which passes through the opening is generally a smaller-diameter shank, and the holding configuration is a head of the fastening means which protrudes radially beyond the shank.

As a rule the holding configuration protrudes a few millimeters beyond an opening rim of the fastening opening, so that with decreasing tear-out strength and in the context of the usual relative movement of different vehicle components which occurs during vehicle operation, the holding configuration can gradually work through the fastening opening and widen it.

At present, a decreasing tear-out strength of the lining components around the above-described fastening openings is counteracted by a local reinforcement of the material of the lining component around the fastening opening, for example by applying stable washers made of metal. This implies, however, a considerable additional outlay in terms of installation and production.

SUMMARY OF THE INVENTION

An object of the present invention is therefore to refine a planar motor vehicle lining component of the species in such a way that it can be locally reinforced as securely as possible with minimal outlay. The intention is thus that a planar motor vehicle lining component of the species, for example in particular of lightweight design, be permanently fastenable onto a motor vehicle, using the hitherto usual fastening means, in simple, secure fashion and with little installation outlay.

The present invention achieves this object by way of a motor vehicle lining component of the kind recited previously which additionally comprises at least one reinforcing portion that is connected to the lining portion and is connected by means of a hinge portion to the lining portion foldably in such a way that a supporting surface region of the reinforcing portion is conveyable, by folding over the reinforcing portion, into abutting engagement with an abutting surface region of the lining portion.

The present invention's manner of achieving the object yields several advantages: on the one hand, the material of the reinforcing portion, or the reinforcing portion, is captively connected to the lining portion by the hinge region. Thus, when the lining portion is located at its intended installation site, the necessary reinforcing portion is also unavoidably at the correct installation site. On the other hand, the reinforcing portion can be conveyed into its final location by simple folding, even by less-qualified persons, upon installation of the lining component on the motor vehicle. The hinge region preferably permits for this purpose only exactly one degree of freedom of motion of the reinforcing portion relative to the lining portion, namely folding around an unequivocal folding axis. Incorrect placement of the reinforcing portion on the lining portion is thus almost ruled out.

In principle, consideration can be given to embodying the hinge region separately from the reinforcing portion and from the lining portion, for example by way of a material that differs from the material of the aforesaid portions, for instance a particularly elastic plastic having high extensibility and high breaking strength, so that a hinge region constituted by such a plastic readily permits, optionally in fact repeatedly permits, the reinforcing portion to be folded over until the abutting engagement of the supporting surface region against the abutting surface region is produced, so that the underbody can be removed from the vehicle for repair purposes and attached to it again.

Embodying the hinge region by way of a hinge component embodied separately from the reinforcing portion and lining portion, for example the aforementioned elastic plastic, which can, for example, be molded by injection molding onto the lining portion and onto the reinforcing portion, also provides the additional advantage that the reinforcing portion can be manufactured from a different material than the lining portion, in particular from a material having greater tear-out strength. Such an embodiment is therefore also a refinement of the present invention. Separate embodiment of the hinge region also, however, means a greater manufacturing outlay.

According to an advantageous refinement of the present invention, the motor vehicle lining component can be manufactured with an advantageously low manufacturing outlay if the reinforcing portion and the lining portion are embodied in one piece with one another. The hinge region can then comprise a material thin-spot configuration in which the component thickness of the lining component is less than in the material portions of the lining component which are adjacent on either side of the material thin-spot configuration orthogonally to the lining component thickness direction. The hinge region can be generated directly upon pressing- or embossing-based manufacture of the lining component. The folding direction in which the reinforcing portion is folded with its supporting surface region onto the abutting surface region of the lining component can furthermore be unequivocally defined by way of an advantageous asymmetrical embodiment of the material thin-spot configurations of the hinge region, protruding into the lining component in a thickness direction from only one side of the lining component.

In principle, in a particular simple embodiment of the present invention, both the reinforcing portion and a region of the lining portion reachable from the reinforcing portion by folding the latter over can be embodied to be flat. As a rule, however, in particular in the context of underbody liners, boss-like embodiments are used in order to connect the lining component to the motor vehicle. A boss-like embodiment is a configuration that forms a protuberance on that side of the lining component which faces toward the motor vehicle in the completely installed state, and forms a recess or depression on the opposite side facing away from the vehicle. For maximally secure and permanent fixed connection of the lining component to an associated vehicle, provision is therefore preferably made that both the supporting surface region of the reinforcing portion and the abutting surface region of the lining portion have a three-dimensional conformation. For example, the aforesaid surface regions can be embodied in a frustoconical shape, the frustoconical shape not necessarily needing to be a truncation of a cone that is rotationally symmetrical with respect to its cone axis. Very generally, a greater load can be carried as the area of the region of the lining component which is reinforced by the reinforcing portion increases, until a permissible load per unit area is exceeded. For that reason, the supporting surface region and the abutting surface region are preferably embodied, at least locally, complementarily with one another. The supporting surface region and the abutting surface region therefore preferably contact one another, when abutting engagement is established, in surface portions that are angled with respect to one another.

In order to ensure that the lining component can be attached even after the reinforcing portion has been folded over, and thus once reinforcement of the lining component is established, provision is preferably made that both the supporting surface region and the abutting surface region each comprise at least one passthrough opening, which align with one another when abutting engagement of the two surface regions is established by folding over. As a result of the aligning passthrough openings, a fastening means, for example a screw, rivet, clip, and the like, can be inserted in passthrough fashion from one side of the reinforcing portion to the opposite side once the reinforcing portion has been folded over and once abutting engagement is established.

In order to prevent residual elasticity of the hinge region from returning the reinforcing portion slightly back out of abutting engagement following folding in order to establish abutting engagement, the reinforcing portion can comprise a locking means that, when abutting engagement of the supporting surface region and abutting surface region is established by folding over, is conveyable into locking engagement with a counterpart locking means of the lining portion. This locking engagement prevents the reinforcing portion from folding back in a folding direction directed oppositely with respect to folding over. Prevention of folding back as a result of inherent elasticity is to be assessed on the basis of a state of the lining component at room temperature, uninfluenced except by unavoidable gravity.

In terms of design, provision can be made concretely that one means from among the locking means and counterpart locking means comprises a latching projection; and that the respective other means comprises a recess into which the latching projection at least projects when locking engagement is established, but which the latching projection preferably penetrates through and engages behind when locking engagement is established. Alternatively or in addition to a latching projection, the one means can encompass a movable positively engaging configuration, for example a pivotable or rotatable hook configuration, which can be guided through the recess as the reinforcing portion is folded over and can be moved, by pivoting or by rotation, into a locking engagement that engages behind an edge portion of the recess.

In order to minimize the manufacturing outlay for the lining component, the movable positively engaging configuration is preferably embodied in one piece with the remainder of that portion, from among the reinforcing portion and lining portion, which carries it. A reduced-thickness material thin-spot region, which facilitates folding or pivoting of the positively engaging configuration relative to the remainder of the portion carrying it by the fact that it reduces the expenditure of force necessary therefor, is preferably located between the positively engaging configuration and the remainder of the portion that carries it.

In principle, the reinforcing portion can be arranged foldably at any point on the lining portion. Preferably, however, the hinge region constitutes an outer edge region of the lining component after the reinforcing portion has been folded over in order to establish abutting engagement between the supporting surface region and abutting surface region. It is thus possible, along with reinforcement of a surface region of the lining portion, simultaneously also to reinforce an edge region of the lining component.

According to a preferred refinement, the reinforcing portion is smaller than the lining portion. When a plurality of reinforcing portions connected to one and the same lining portion are provided, all the reinforcing portions considered together are preferably smaller than the lining portion. Because both the lining portion and the reinforcing portion, constituting constituents of the planar lining components, are embodied to be planar as defined above, "smaller" as defined above means smaller in terms of area, not necessary smaller in terms of mass, although the area occupied by a portion and the mass of a portion will in most cases be proportional to one another.

For effective thermal and acoustic and mechanical shielding of a vehicle portion from external influences or, in the case of acoustics, also in order to shield the external region of the vehicle from noise sources within the vehicle, the lining component can encompass a thermoplastically bonded fiber web material. In order to achieve the lowest possible weight per unit area simultaneously with a good shielding effect, the material is preferably porous. The porous thermoplastically bonded fiber web material can require and exhibit different strengths at different locations, so that the thermoplastically bonded fiber web material particularly preferably has a locally differing porosity. A preferred material for manufacturing the lining component is a "low weight reinforced thermoplastic" (LWRT).

Because local reinforcement of lining components is necessary in particular as weight per unit area decreases, a low weight per unit area simultaneously being desirable in order to achieve the lowest possible vehicle weight, according to an advantageous embodiment the lining component has an average weight per unit area of no more than 1100 g/m², preferably no more than 1000 g/m². Lining components having a higher average weight per unit area as a rule can, but do not need to, be installed without reinforcement on a vehicle. The lining portion preferably has a weight per unit area of no more than the aforesaid values at least in an environment having a radius of 7 cm around the center of a passthrough opening for fastening the lining component onto a motor vehicle.

The present invention also relates to a motor vehicle having a planar lining component as described and refined above. The lining component is, in particular, an underbody liner, a wheel well liner, and/or an engine compartment liner of the motor vehicle.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
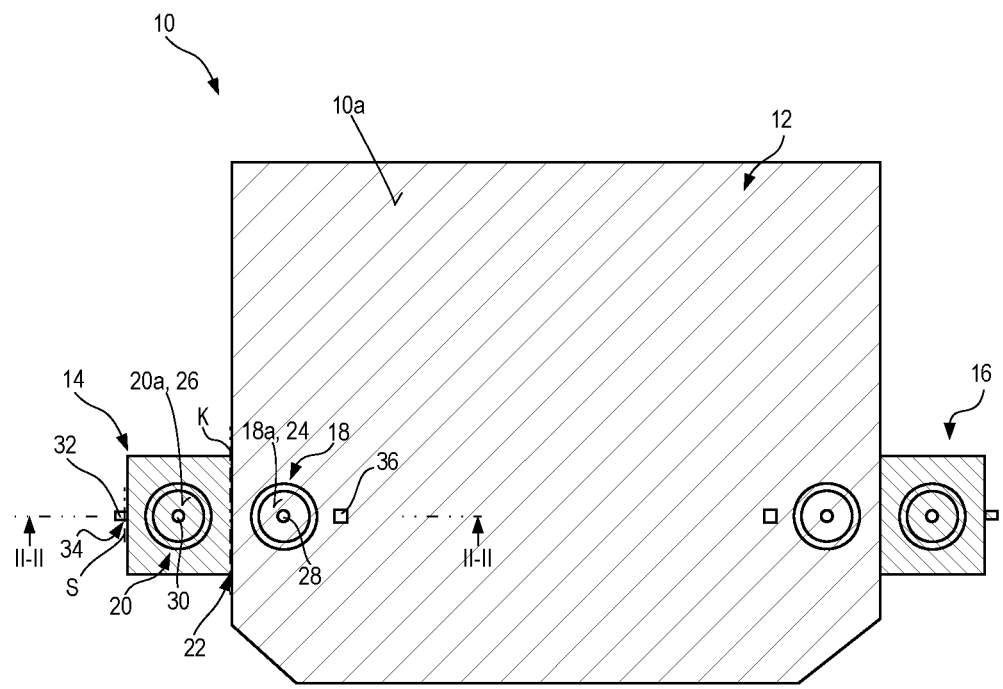
FIG. 1 is a schematic plan view of a motor vehicle lining component according to the present invention which can be supplied for installation on a motor vehicle.

Referring now to the drawings wherein the showings are for the purpose of illustrating preferred and alternative embodiments of the invention only and not for the purpose of limiting the same, in FIG. 1, a motor vehicle lining component in the exemplifying form of an underbody liner of a motor vehicle is labeled in general with the number 10. The viewer of FIG. 1 is looking at that side 10a of lining component 10 which, in the completely installed state, faces away from the vehicle that carries lining component 10.

Lining component 10 is advantageously embodied in one piece by press-shaping a porous thermoplastically bonded fiber web (LWRT) into a shape predefined by the respective pressing mold. Despite the one-piece embodiment, different portions of lining component are differently cross-hatched for better differentiation.

That portion of lining component 10 which has the largest area is a central lining portion 12 that, when lining component 10 is in the completely installed state, covers a predetermined area portion of the motor vehicle that carries lining component 10. A respective reinforcing portion 14 and 16 projects on either side from lining portion 12. Reinforcing portions 14 and 16 are configured substantially identically and are simply connected to lining portion 12 at different points thereon. Only reinforcing portion 14 will therefore be described below, as a representative of both reinforcing portions 14 and 16.

Lining portion 12 comprises, in a region that can be covered by folding reinforcing portion 14 over, a fastening boss 18 that, in FIG. 1, protrudes out of the drawing plane of FIG. 1 away from the viewer of FIG. 1. The viewer of FIG. 1 therefore perceives fastening boss 18 in FIG. 1 as a depression or recess in lining portion 12.

Reinforcing portion 14 likewise comprises a reinforcing boss 20 that extends out of the drawing plane of FIG. 1 toward the viewer of FIG. 1. The viewer of FIG. 1 therefore perceives reinforcing boss 20 as a protrusion in reinforcing portion 14.

Reinforcing portion 14 can be folded over in a hinge region 22 (more readily apparent in FIGS. 2 and 3) around a folding axis K in order to overlap with lining portion 12. Reinforcing boss 20 is embodied with its outer surface 20a to be complementary to inner surface 18a of fastening boss 18 in such a way that it fits in planarly abutting fashion against inner surface 18a of fastening boss 18. Inner surface 18a is therefore an abutting surface region 24 of lining portion 12. Outer surface 20a of reinforcing boss 20 is a supporting surface region 26 of reinforcing portion 14.

After reinforcing portion 14 has been folded over around folding axis K, surface regions 24 and 26 are in abutting engagement with one another.

Each of the portions (lining portion 12 and reinforcing portion 14) comprises a respective passthrough opening 28, 30 through which a fastening means can be passed in order to fasten lining component 10 to a motor vehicle.

Reinforcing portion 14 furthermore comprises a positively engaging locking hook 32, movable relative to reinforcing portion 14 and thus also relative to lining portion 12, which is arranged pivotably in a hinge configuration 34 around a pivot axis S parallel to folding axis K.

Lining portion 12 comprises an associated locking recess 36 that, when reinforcing portion 14 is in the folded-over state, can be passed through by locking hook 32 that is then pivoted.

Figure 2:
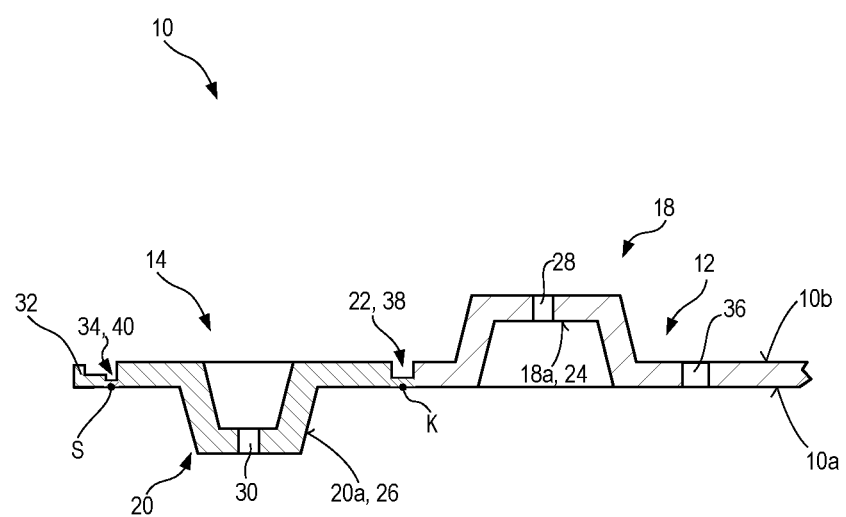
FIG. 2 is a schematic section view, along line II-II of FIG. 1, through the lining component of FIG. 1.

FIG. 2 is a cross section, along section plane II-II, through lining component 10 in the delivered state shown in FIG. 1. Hinge region 22 and hinge configuration 34 are more readily apparent in FIG. 2 than in FIG. 1. Hinge region 22 encompasses a material thin-spot configuration 38 in which the thickness of lining component 10 is less than in those regions of lining component 10 which are directly adjacent to hinge region 22. Hinge region 22 extends in straight-line fashion over the entire dimension along which reinforcing portion 14 adjoins lining portion 12.

Material thin-spot configuration 38 is introduced asymmetrically into lining component 10, specifically only from side 10b which, in the completely installed state, faces toward the motor vehicle that carries lining component 10. The preferred folding direction in the context of folding reinforcing portion 14 over onto lining portion 12 is thus defined by the embodiment of hinge region 22, namely counter-clockwise around folding axis K in FIG. 2.

Hinge configuration 34 also has a material thin-spot region 40 in which the thickness of lining component 10 is likewise less than in the regions adjacent to material thin-spot region 40. Material thin-spot region 40 is also introduced asymmetrically into lining component 10 from only one side, in the example depicted (like material thin-spot configuration 38) from side 10b which faces toward the motor vehicle in the completely installed state. Material thin-spot region 40 likewise extends in straight-line fashion over the entire dimension along which positively engaging locking hook 32 adjoins the remainder of reinforcing portion 14.

Figure 3:
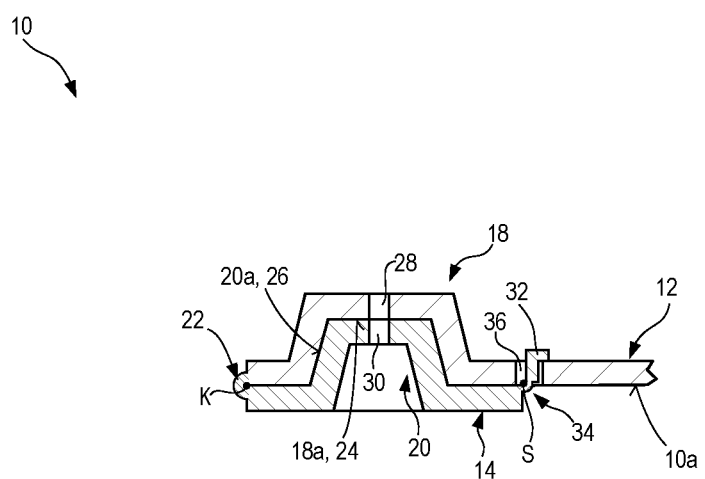
FIG. 3 is the section view of FIG. 2 after the reinforcing portion has been folded over, and after an abutting engagement between the reinforcing portion and lining portion is established and secured.

With the asymmetrical embodiment of material thin-spot region 40, the pivoting direction of positively engaging locking hook 32 from the delivered state of FIG. 2 to the installation-ready state of FIG. 3 is also a counter-clockwise pivoting direction (when viewing FIGS. 2 and 3).

FIG. 3 shows the installation-ready state of lining component 10. For local doubling of the material of lining component 12, reinforcing portion 14 is folded over around folding axis K in such a way that outer surface 20a of reinforcing boss 20 is brought into abutting engagement with inner surface 18a of fastening boss 18.

Utilizing its movability, or more precisely pivotability, around pivot axis S, the movable positively engaging locking hook 32 is passed through locking recess 36 and engages behind material of lining region 12 which delimits locking recess 36. Without additional actions, it is thus no longer possible for reinforcing portion 14 to fold back around folding axis K. The installation-ready lining component 10 can be set aside during installation with no possibility for the installed state to release itself and need to be re-established.

Passthrough openings 28 and 30 respectively of fastening boss 18 and of reinforcing boss 20 align in the installation-ready state, so that the shank of a fastening means, for example a screw, a rivet, a clip, and the like, can readily be passed through the two passthrough openings 28 and 30. The shank of the fastening means can then be connected to the motor vehicle that carries lining component 10. A head of the fastening means which protrudes radially beyond the shank and beyond passthrough openings 28 and 30 can then engage behind passthrough openings 28 and 30 and abuts in permanently secured fashion against the doubled material of the lining component around passthrough openings 28 and 30.

In principle, it can also be sufficient if the head of the fastening means projects radially only beyond passthrough opening that is located directly closer to it. In the interest of greater strength, however, it is preferred for the head of the fastening means to engage behind both passthrough openings 28 and 30. Passthrough openings 28 and 30 therefore are preferably of the same size and have substantially the same shape.

The reinforcing local doubling of material of the reinforcing portion in the region of a fastening point of the reinforcing portion is depicted merely by way of example. Instead of a fastening point or a passthrough opening 28, a different structure on lining component 12, for example a stiffening rib or crease, can also be reinforced by a local material doubling in the course of a folding over of a reinforcing portion 14 if there is a risk that without local doubling, the stiffening rib or crease might not impart sufficient rigidity to lining component 10.

As is further evident from FIG. 3, hinge region 22 forms a part of an outer edge of lining component 10 when lining component 10 is in the installation-ready state, i.e. after reinforcing portion 14 has been folded over onto lining portion 12.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A planar motor vehicle lining component made of a plastic-containing material, having a lining portion of predetermined shape which is embodied to cover, in the completely installed state, a predetermined area on a motor vehicle,
wherein the lining component comprises at least one reinforcing portion that is connected to the lining portion and is connected by a hinge portion to the lining portion foldably in such a way that a supporting surface region of the at least one reinforcing portion is conveyable, by folding over the at least one reinforcing portion, into abutting engagement with an abutting surface region of the lining portion.

2. The planar motor vehicle lining component according to claim 1, wherein the at least one reinforcing portion and the lining portion are embodied in one piece with one another; the hinge portion comprising a material thin-spot configuration in which a component thickness of the lining component is less than in the material portions of the lining component which are adjacent on either side of the material thin-spot configuration orthogonally to a lining component thickness direction.

3. The planar motor vehicle lining component according to claim 1, wherein both the supporting surface region of the at least one reinforcing portion and the abutting surface region of the lining portion have a three-dimensional conformation; the supporting surface region and the abutting surface region being embodied, at least locally, complementarily with one another.

4. The planar motor vehicle lining component according to claim 1, wherein both the supporting surface region and the abutting surface region each comprise at least one passthrough opening, which align with one another when the abutting engagement of the two surface regions is established by folding over.

5. The planar motor vehicle lining component according to claim 1, wherein the at least one reinforcing portion comprises a locking arrangement that, when the abutting engagement of the supporting surface region and abutting surface region is established by folding over, is conveyable into locking engagement with a counterpart locking arrangement of the lining portion, which engagement prevents the at least one reinforcing portion from folding back in a folding direction directed oppositely with respect to folding over.

6. The planar motor vehicle lining component according to claim 5, wherein one of the locking arrangement and the counterpart locking arrangement comprises a latching projection or a movable positively engaging configuration; and the respective other of the locking arrangement and the counterpart locking arrangement comprises a recess into which the latching projection or the movable positively engaging configuration at least projects when the locking engagement is established.

7. The planar motor vehicle lining component according to claim 6, wherein the latching projection or the movable positively engaging configuration penetrates through and engages behind when the locking engagement is established.

8. The planar motor vehicle lining component according to claim 6, wherein the latching projection or the movable positively engaging configuration is embodied in one piece with the remainder of that portion, from among the at least one reinforcing portion and lining portion, which carries it.

9. The planar motor vehicle lining component according to claim 8, wherein the latching projection or the movable positively engaging configuration has a reduced-thickness material thin-spot region between the movable positively engaging configuration and the remainder of the portion that carries it.

10. The planar motor vehicle lining component according to claim 1, wherein the hinge portion constitutes an outer edge region of the lining component after the at least one reinforcing portion has been folded over in order to establish the abutting engagement between the supporting surface region and abutting surface region.

11. The planar motor vehicle lining component according to claim 1, wherein the at least one reinforcing portion is smaller than the lining portion.

12. The planar motor vehicle lining component according to claim 1, wherein the at least one reinforcing portion is a plurality of reinforcing portions.

13. The planar motor vehicle lining component according to claim 12, wherein when the plurality of reinforcing portions are connected to the same lining portion, all of the plurality of reinforcing portions together being smaller than the lining portion.

14. The planar motor vehicle lining component according to claim 1, wherein the planar motor vehicle lining component includes a thermoplastically bonded fiber web material.

15. The planar motor vehicle lining component according to claim 14, wherein the thermoplastically bonded fiber web material includes a porous thermoplastically bonded fiber web material.

16. The planar motor vehicle lining component according to claim 15, wherein the porous thermoplastically bonded fiber web material has a locally differing porosity that can include a low weight reinforced thermoplastic.

17. The planar motor vehicle lining component according to claim 1, wherein the planar motor vehicle lining component has an average weight per unit area of no more than 1100 $g/m^2$.

18. The planar motor vehicle lining component according to claim 1, wherein the planar motor vehicle lining component has an average weight per unit area of no more than 1000 $g/m^2$.

19. The planar motor vehicle lining component according to claim 1, wherein the planar motor vehicle lining component is one of an underbody liner, a wheel well liner and an engine compartment liner.

20. A motor vehicle having a planar lining component according to claim 1.

* * * * *